(12) United States Patent
Roses et al.

(10) Patent No.: US 9,739,339 B2
(45) Date of Patent: Aug. 22, 2017

(54) ISOLATING TORQUE COUPLER

(71) Applicant: GM GLOBAL TECHNOLOGY OPERATIONS LLC, Detroit, MI (US)

(72) Inventors: Victor M. Roses, Ann Arbor, MI (US); Peter W. Mack, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 232 days.

(21) Appl. No.: 14/591,039

(22) Filed: Jan. 7, 2015

(65) Prior Publication Data
US 2016/0195156 A1 Jul. 7, 2016

(51) Int. Cl.
*F16F 15/123* (2006.01)

(52) U.S. Cl.
CPC .... *F16F 15/1232* (2013.01); *F16F 15/12313* (2013.01)

(58) Field of Classification Search
CPC ............. F16F 15/12313; F16F 15/1232; F16F 15/12353; F16F 15/13415; F16F 15/1343; F16F 15/13469
USPC .................................... 464/68.1, 68.9, 68.92
See application file for complete search history.

(56) References Cited

U.S. PATENT DOCUMENTS

| | | | |
|---|---|---|---|
| 4,702,721 A * | 10/1987 | Lamarche | F16F 15/12313 464/68.1 |
| 6,220,966 B1 * | 4/2001 | Ara | F16F 15/134 464/68.1 |
| 8,562,446 B2 * | 10/2013 | Nishitani | F16F 15/12353 464/68.1 |
| 8,562,447 B2 * | 10/2013 | Mizuta | F16F 15/1232 464/68.92 |

* cited by examiner

*Primary Examiner* — Josh Skroupa
(74) *Attorney, Agent, or Firm* — Quinn IP Law

(57) ABSTRACT

An isolating torque coupler includes a drive element assembled between annular cage elements of a driven element. The cage elements each include a plurality of aligned voids. The drive element includes a hub portion and a plurality of lobes with each of the lobes including a first edge and a second edge. Openings in the drive element are aligned with the voids of the cage elements to accommodate isolator springs. Each isolator spring is a helical coil compression spring having squared ends. A first edge of each of the lobes of the drive element is parallel to a second end of the corresponding one of the voids of the driven element. A second edge of each of the lobes of the drive element is non-parallel to a first end of the corresponding one of the voids of the driven element.

20 Claims, 4 Drawing Sheets

ISOLATING TORQUE COUPLER

TECHNICAL FIELD

This disclosure relates to torque coupling devices, including isolating torque couplers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Powertrain systems may employ a torque converter to fluidly couple an internal combustion engine and a transmission to absorb driveline shocks and isolate engine vibrations from the driveline. Hybrid electric powertrain systems may employ clutch elements to decouple vibrations from engine and transmission elements and other driveline components.

SUMMARY

An isolating torque coupler rotatably coupling a rotatable drive member and a rotatably driven member includes a disk-shaped drive element assembled between first and second annular cage elements assembled onto a driven element. The first and second annular cage elements each have an outer periphery and include a plurality of voids, each void having a substantially rectangular shape including first and second sides and first and second ends, wherein each first side is proximal to a center point associated with the center line and perpendicular to a radial line from the center point and wherein the second side is distal to the center point and curved concentric to the outer periphery. The drive element includes a hub portion and a plurality of lobes formed near the outer periphery, the lobes defining a plurality of openings formed near the outer periphery, wherein each of the lobes includes a first edge and a second edge. The openings of the drive element are aligned with the voids of the first and second cage elements to accommodate a corresponding plurality of isolator springs inserted therein. Each isolator spring is a helical coil compression spring having a unitary diameter and squared first and second ends. The first edge of each of the lobes of the drive element is contiguous to the first end of each of a corresponding one of the voids of the driven element. The second edge of each of the lobes of the drive element is contiguous to the second end of each of a corresponding one of the voids of the driven element. The first edge of each of the lobes of the drive element is parallel to the second end of the corresponding one of the voids of the driven element. The second edge of each of the lobes of the drive element is non-parallel to the first end of the corresponding one of the voids of the driven element.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically depicts a portion of an embodiment of the isolator including the first edge of one of the lobes of the drive element in parallel to the second ends of the first and second annular cage elements, in accordance with the disclosure;

FIG. 3-2 schematically depicts a portion of an embodiment of the isolator including the second edge of one of the lobes of the drive element non-parallel to the first ends of the first and second annular cage elements, in accordance with the disclosure.

DETAILED DESCRIPTION

Figure 1:
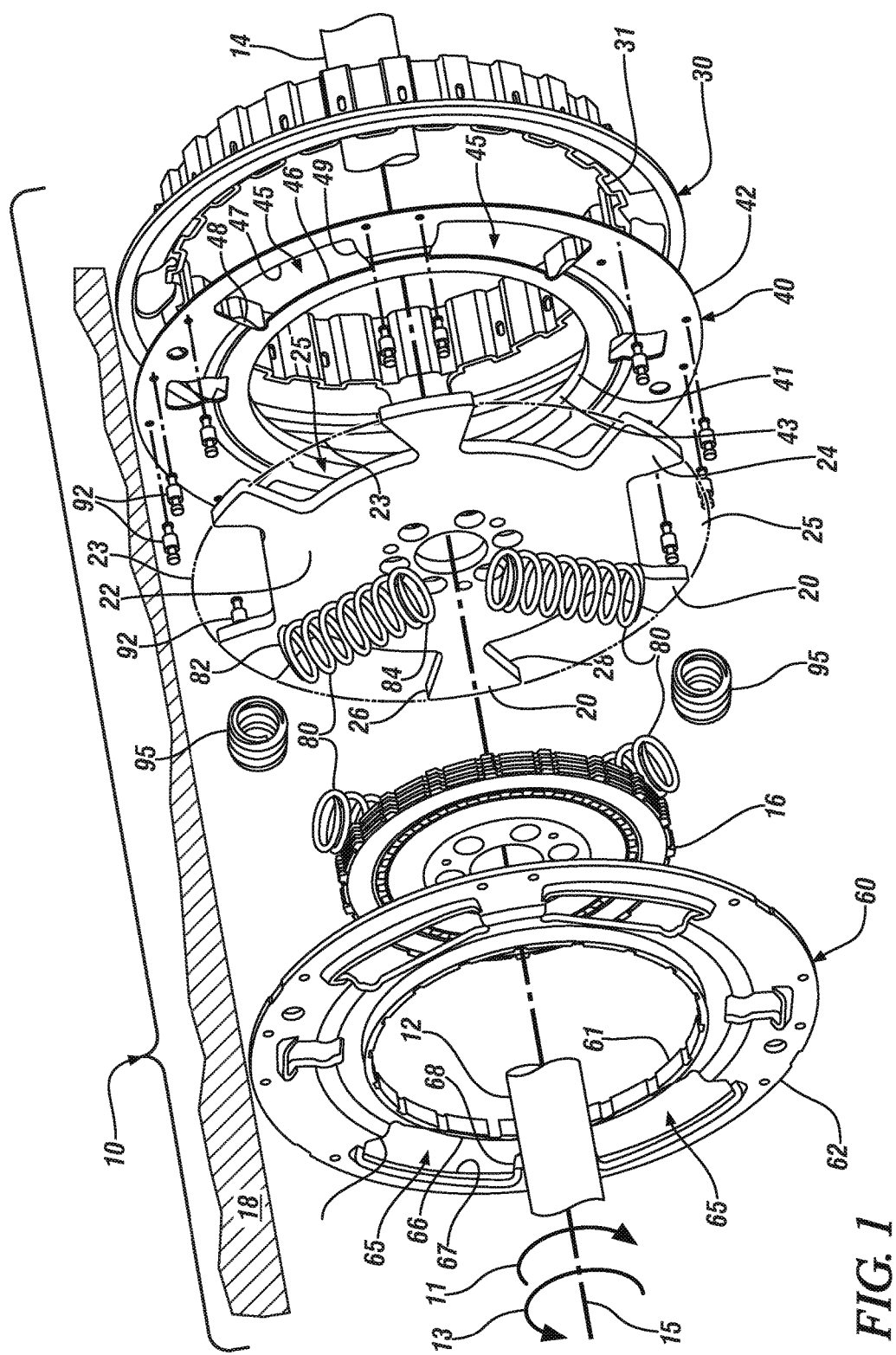
FIG. 1 shows an isometric exploded view of an isolating torque coupling device (isolator) including a drive element and a driven element including a first cage element and a second cage element, in accordance with the disclosure.
Figure 2:
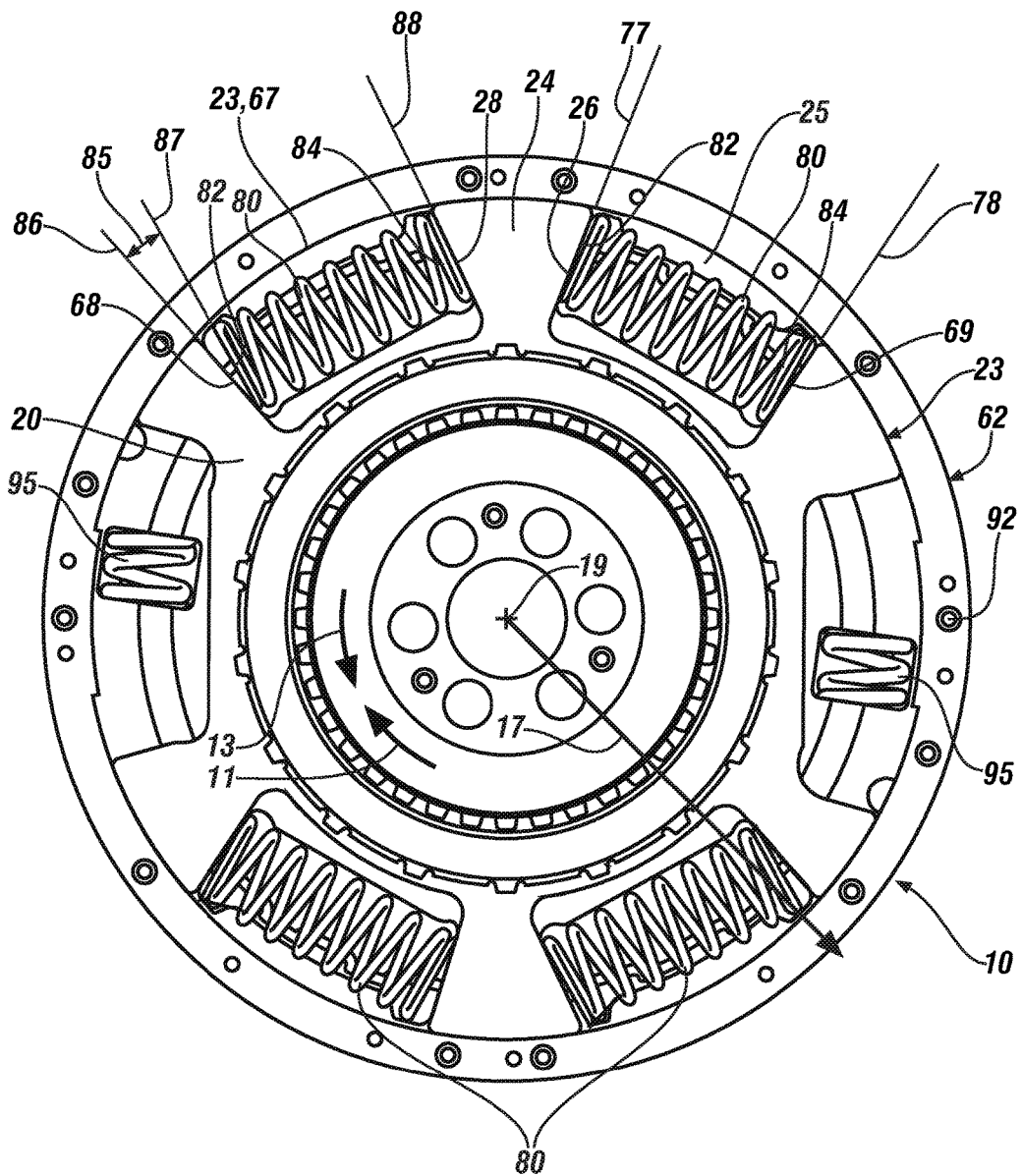
FIG. 2 shows a partially assembled front view of the isolator including the drive element and the second cage element of the driven element with the first cage element of the driven element being omitted, in accordance with the disclosure.

Referring now to the drawings, wherein the depictions are for the purpose of illustrating certain exemplary embodiments only and not for the purpose of limiting the same, FIGS. 1 and 2 schematically illustrate an isolating torque coupling device (isolator) 10 including a drive element 20 and a driven element 30 including a first cage element 40 and a second cage element 60. FIG. 1 shows an isometric exploded view of the isolator 10 including the drive element 20 and the driven element 30 including the first cage element 40 and the second cage element 60, and FIG. 2 shows a partially assembled front view of the isolator 10 including the drive element 20 and the second cage element 60 of the driven element 30, with the first cage element 40 of the driven element 30 being omitted. In one embodiment, the isolator 10 is assembled into a housing 18 of a transmission device to mechanically rotatably couple a rotatable drive member 12 and a rotatable driven member 14 to effect torque transfer therebetween in either a first rotational direction 11 or a second, opposite rotational direction 13. In one embodiment, the isolator 10 is configured to transfer torque between an internal combustion engine and an electrically-variable transmission device in an extended-range electric powertrain system or a fuel/electric hybrid powertrain system. Alternatively, the isolator 10 can be employed to transfer torque between the drive member 12 and the driven member 14 in any other torque drive configuration.

The isolator 10 includes a disk-shaped drive element 20 that rotatably couples to a coaxial disk-shaped driven element 30 employing a plurality of isolator springs 80, kicker springs 95 and other elements. The drive element 20 is preferably coaxial with and rotatably coupled to the drive member 12 and the driven element 30 is preferably coaxial with and rotatably coupled to the driven member 14. The drive element 20 and the driven element 30 are coaxial along a center line 15. As described herein, the isolator 10 is capable of transferring torque between the drive element 20 and the driven element 30 in either the first direction 11 associated with a drive state or the second direction 13 associated with a driven or coast state. Like numerals and like terms indicate like or corresponding parts throughout the several views. The terms "drive" and "drive member" indicate that such elements are associated with a prime mover, such as an internal combustion engine. The terms "driven" and "driven member" indicate that such elements are associated with an output device, such as a transmission or another driveline element. As such, the drive member 12 transfers torque through the isolator 10 to the driven member 14 in the first direction 11 to generate tractive torque for vehicle propulsion in a forward direction. Likewise, the driven member 14 transfers torque through the isolator 10 to the drive member 12 in the second direction 13 to generate reactive torque for vehicle braking when the vehicle is moving in the forward direction.

The drive element 20 is preferably a disk-shaped element that is coaxial to and assembled between first and second annular cage elements 40, 60, respectively, of the driven element 30 that rotatably couples to the driven member 14. The first and second annular cage elements 40, 60 are plate-shaped elements having an inner periphery 41, 61, respectively and an outer periphery 42, 62, respectively. The inner periphery 41 of the first annular cage element 40 includes a circumferential flange 43 that projects axially to the center line 15 and inserts into a concentric race 31 formed on an inner circumference of the driven element 30. The inner periphery 61 of the second annular cage element 60 accommodates a clutch pack 16 that assembles onto the drive element 20 and rotates therewith. The clutch pack 16 is preferably an internal bypass clutch element that facilitates engine starting events in one embodiment.

The first and second annular cage elements 40, 60 each have a plurality of voids 45, 65, respectively formed therein. The voids 45 of the first cage elements 40 are aligned with the voids 65 of the second cage elements 60 when the first and second annular cage elements 40, 60 are assembled together. The first and second annular cage elements 40, 60 are assembled together employing rivets 92 or other fasteners near their outer peripheries 42, 62. Each of the voids 45, 65 has a substantially rectangular shape including first, inner sides 46, 66, respectively, second, outer sides 47, 67, respectively, first ends 48, 68, respectively and second ends 49, 69, respectively. The first sides 46, 66 are proximal to the center line 15 having a predefined length and perpendicular to a radial line 17 projecting from a center point 19 defined by the center line 15 in a plane formed by the respective cage element 40, 60. The first ends 48, 68, respectively and second ends 49, 69, respectively, project orthogonal to the first sides 46, 66, respectively, in the plane formed by the respective cage element 40, 60. Preferably, the first ends 48, 68 and the second ends 49, 69 have equal lengths. The second sides 47, 67 are curved arcs that are distal to the center line 15. The curved arcs forming the second sides 47, 67 are preferably concentric with the outer periphery 42, 62, at a radius that is less than an outer radius defined by the outer periphery 42, 62. As such, each of the voids 45, 65 is described as having a substantially rectangular shape in that the respective first inner sides 46, 66, the respective first ends 48, 68 and the respective second ends 49, 69 form rectangular elements that are joined on the respective second sides 47, 67. Alternatively, the second sides 47, 67 may be formed as non-arced lines that are parallel to the corresponding first sides 46, 66. Alternatively, the second sides 47, 67 may be formed as curved arcs that are eccentric to the outer periphery 42, 62, with the eccentricity having a decreasing radius with increasing rotational travel of the drive element 20 in relation to the first and second cage elements 40, 60, thus inducing increased friction with increased rotational travel. Alternatively, the second sides 47, 67 may be formed as curved arcs that are eccentric to the outer periphery 42, 62, with the eccentricity having an increasing radius with increasing rotational travel of the drive element 20 in relation to the first and second cage elements 40, 60, thus inducing decreased friction with increased rotational travel.

The drive element 20 includes a hub portion 22 that couples via the clutch pack 16 to the drive member 12. A plurality of lobes 24 project radially from the hub portion 22 and are formed near an outer periphery 23 thereof. The lobes 24 define a plurality of openings 25 that are near the outer periphery 23. The openings 25 between the lobes 24 of the drive element 20 are aligned with the voids 45, 65 of the first and second cage elements 40, 60 when the first and second annular cage elements 40, 60 and the drive element 20 are assembled together. Each of the lobes 24 includes a first edge 26 and a second edge 28. The openings 25 between the lobes 24 of the drive element 20 aligned with the voids 45, 65 of the first and second cage elements 40, 60 accommodate the isolator springs 80 that are inserted therein. Furthermore, the outer periphery 23 of the drive element 20 is aligned with the second sides 47, 67 of the voids 45, 65 formed in the first and second annular cage elements 40, 60.

Each of the isolator springs 80 is preferably a helical coil straight-sided compression spring having a unitary diameter and squared first and second ends 82, 84, respectively. Compression springs having squared ends include those springs wherein pitch of each end coil is gradually reduced so that its outer face is perpendicular to a longitudinal axis of the spring, and may be accomplished by grinding, machining, or another suitable operation. In one embodiment, the first and second ends 82, 84 have end caps (not shown) assembled thereon to achieve the squared end. Alternatively, the isolator springs can include any suitable compressible spring element that has squared first and second ends 82, 84. The squareness of compression spring ends influences the manner in which the axial force produced by the spring can be transferred to the adjacent bearing elements. Preferably, the outer surfaces of the isolator springs 80 are free from burrs and other abrasive surface features that may cause wear on the second sides 47, 67 of the voids 45, 65 of the first and second annular cage elements 40, 60.

The first edge 26 of each of the lobes 24 of the drive element 20 is contiguous to the first ends 48, 68 of each of the voids 45, 65 of the first and second annular cage elements 40, 60 coupled to the driven element 30. The second edge 28 of each of the lobes 24 of the drive element 20 is contiguous to the second ends 49, 69 of each of the voids 45, 65 of the first and second annular cage elements 40, 60 coupled to the driven element 30. The first edge 26 of each of the lobes 24 of the drive element 20 is parallel to the second ends 49, 69 of the first and second annular cage elements 40, 60 of the driven element 30 for each of the voids 45, 65. This parallel arrangement is depicted in FIG. 2 by reference lines 77 and 78. As such, the first edge 26 and the second ends 49, 69 exert a linear compressive load on the corresponding isolator spring 80 when urged in a first rotational direction, i.e., when operating in the first direction 11 associated with the drive state.

The second edge 28 of each of the lobes 24 of the drive element 20 is non-parallel to the first ends 48, 68 of the corresponding one of the voids 45, 65 of the driven element 30. This non-parallel arrangement is depicted in FIG. 2 by reference lines 86, 87, and 88 and angle 85 between reference lines 86 and 87. Reference line 88 indicates the second edge 28 of one of the lobes 24, reference line 86 indicates the first end 68 of the second annular cage element 60, reference line 87 indicates the first end 82 of the corresponding isolator spring 80 and angle 85 indicates the angular difference between reference lines 86 and 87. As such, the second edge 28 and the first ends 48, 68 exert a non-linear compressive load on the corresponding spring 80 when urged in the second direction 13 associated with the driven or coast state. When the non-linear compressive load is exerted on the spring 80 in the second rotational direction, the spring 80 is urged to buckle outwardly towards the outer periphery 23 and interferingly moves against the second sides 47, 67 of the voids 45, 65 of the first and second annular cage elements 40, 60 in response to the non-linear compressive buckling load on the spring 80, thus inducing a friction load on the spring 80. The friction load on the spring 80 introduces hysteresis into the compression of the spring 80, which is shown with reference to FIG. 4.

Figures 1, 3:
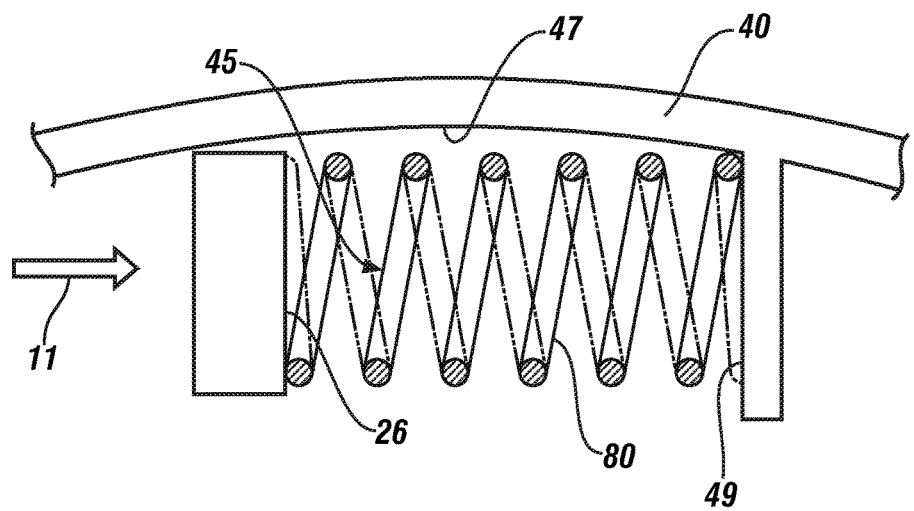
Figures 2, 3:
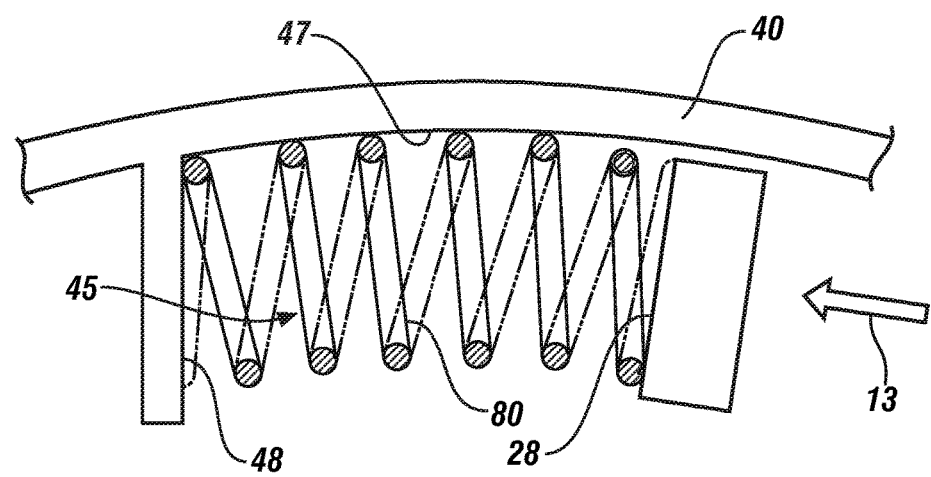

FIG. 3-1 schematically depicts a portion of an embodiment of the isolator 10 including the first edge 26 of one of the lobes 24 of the drive element 20 in parallel to the second ends 49, 69 of the first and second annular cage elements 40, 60. The first edge 26 and the second ends 49, 69 exert a linear compressive load on the corresponding spring 80 when urged in a first rotational direction, i.e., when operating in the first direction 11, which is preferably associated with a drive direction.

FIG. 3-2 schematically depicts a portion of an embodiment of the isolator 10 including the second edge 28 of one of the lobes 24 of the drive element 20 in parallel to the first ends 48, 68 of the first and second annular cage elements 40, 60. The second edge 28 and the first ends 48, 68 exert a non-linear compressive load on the corresponding spring 80 when urged in a second rotational direction, i.e., when operating in the second direction 13 that is preferably associated with a coast direction. When the non-linear compressive load is exerted on the spring 80 in the second rotational direction 13, the spring 80 is urged to buckle outwardly and interferingly move against the second sides 47, 67 of the voids 45, 65 of the first and second annular cage elements 40, 60 in response to the non-linear compressive buckling load on the spring 80, thus inducing a friction load on the spring 80. In this manner, the isolator 10 provides additional hysteresis in the coast direction of isolator travel using the existing spring isolator content without the need for an additional hysteresis device to absorb and mitigate impulses from the drive side, such as an ice clunk or an engine misfire event.

Figure 4:
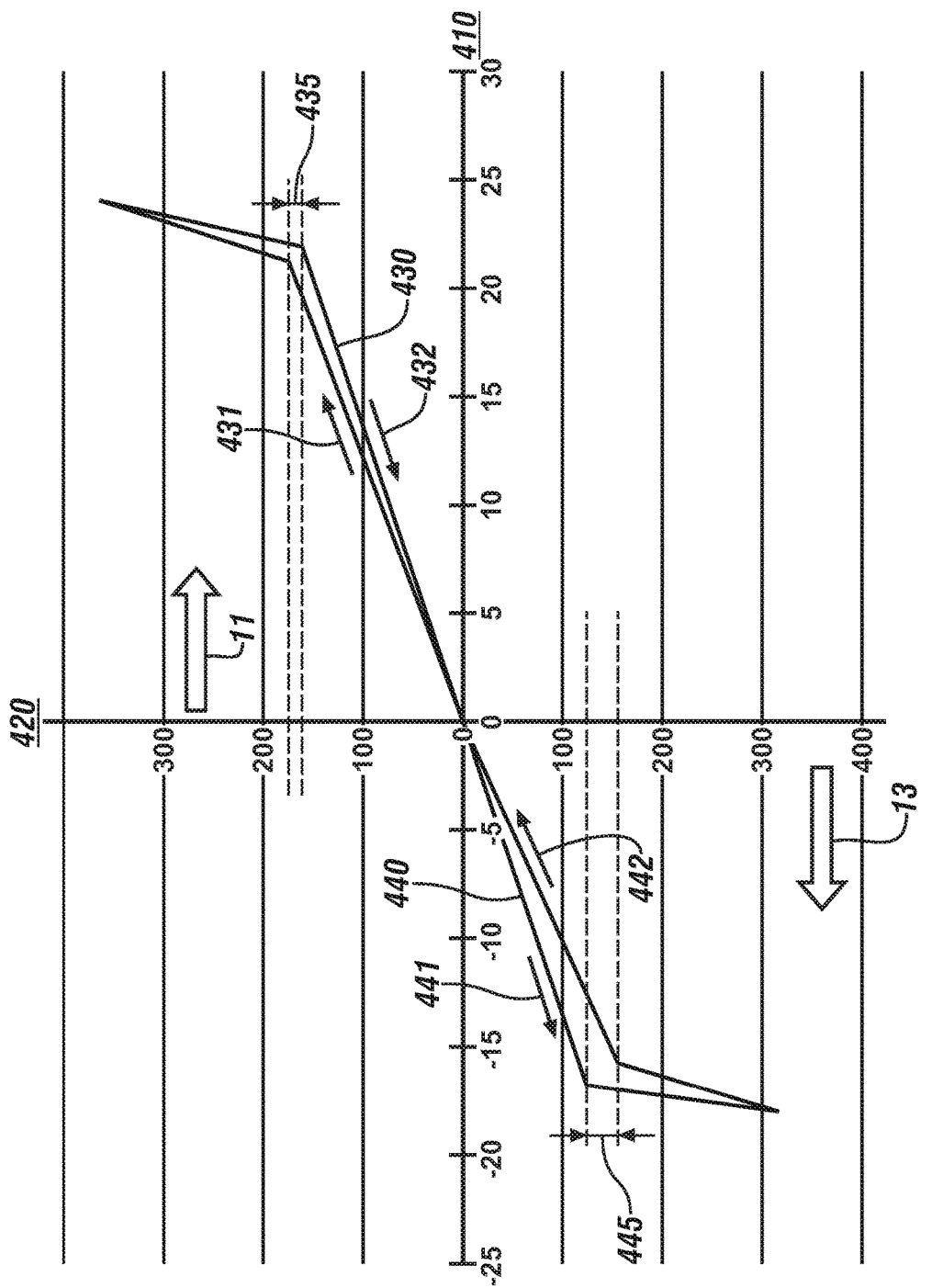
FIG. 4 graphically shows rotational travel on the horizontal axis (in degrees of rotation) in relation to applied torque on the vertical axis for an embodiment of the isolator, wherein the applied torque includes the first rotational direction associated with driving torque on the right side and the second rotational direction associated with coasting torque, in accordance with the disclosure.

FIG. 4 graphically shows rotational travel on the horizontal axis 410 (in degrees of rotation) in relation to applied torque on the vertical axis 420 for an embodiment of the isolator 10 described herein, wherein the applied torque includes a first rotational travel 430 in the first rotational direction 11 associated with driving torque on the right side and second rotational travel 440 in the second rotational direction 13 associated with coasting torque. The first and second rotational travels 430, 440 indicate rotation of the drive element 20 in relation to the driven element 30. The first rotational travel 430 includes rotational travel associated with increasing driving torque 431 and rotational travel associated with decreasing driving torque 432. As shown, there is a drive-side hysteresis 435 between the rotational travel associated with increasing driving torque 431 and the rotational travel associated with decreasing driving torque 432 that is about 4 Nm at a maximum rotational travel of about 22° of rotation. The second rotational travel 440 includes rotational travel associated with increasing coasting torque 441 and rotational travel associated with decreasing coasting torque 442. Similarly, and as shown, there is a coast-side hysteresis 445 between the rotational travel associated with increasing coasting torque 441 and the rotational travel associated with decreasing coasting torque 442 that is about 9 Nm at a maximum rotational travel of about 17° of rotation. The added hysteresis, caused by the friction load on the spring 80 due to non-linear compressive buckling load on the spring 80, provides damping to absorb unplanned torque spikes.

The isolator 10 described herein provides additional torque hysteresis in one of the directions of rotation to provide additional torque damping in one direction of rotation during unplanned events such as ice clunk, panic braking and engine misfire events, thus absorbing or mitigating torque spikes to avoid isolator and transmission damage. The isolator 10 has a low level of hysteresis in the other direction of rotation to avoid driveline growl and other objectionable noises under other operating events, such as electric vehicle operation. The spring rate and spring and torque capacities are unchanged in both the first and second directions of rotation, and there is no effect on operation of the by-pass clutch 16. It is appreciated that the spring rates and hysteresis features are tunable for a specific application. The surfaces of the isolator cages, springs and drive hub preferably require hardened surfaces, which may be in use. The principle advantage of employing the isolator 10 as described herein is that there is no effect on packaging space, component mass, and no need for additional components to achieve the resulting performance gain.

The configuration described herein does not require any additional axial or radial room and can use existing parts with minor modifications to the geometry of the drive element 20. The design is active only in the coast region while maintaining current (low) hysteresis in the normal usage range of operation without any impact to powertrain-generated noise and vibration.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An isolating torque coupler rotatably coupling a rotatable drive member and a rotatably driven member, comprising:
    a disk-shaped drive element positioned between first and second annular cage elements that are assembled onto a driven element;
    the first and second annular cage elements each defining an outer periphery and a plurality of aligned voids, each void having a substantially rectangular shape including first and second sides and first and second ends;
    the drive element including a hub portion and a plurality of lobes formed near the outer periphery, the lobes defining a plurality of openings formed near the outer periphery, wherein each of the lobes includes a first edge and a second edge;
    the plurality of openings of the drive element aligned with the voids of the first and second cage elements to accommodate a corresponding plurality of isolator springs inserted therein;

each isolator spring being a helical coil compression spring having squared first and second ends;

the first edge of each of the lobes of the drive element being contiguous with the first end of each of a corresponding one of the voids of the driven element;

the second edge of each of the lobes of the drive element being contiguous with the second end of each of a corresponding one of the voids of the driven element;

the first edge of each of the lobes of the drive element being parallel to the second end of the corresponding one of the voids of the driven element;

the second edge of each of the lobes of the drive element being non-parallel to the first end of the corresponding one of the voids of the driven element.

2. The isolating torque coupler of claim 1, wherein the first edge of each of the lobes of the drive element and the second end of the corresponding one of the voids of the driven element exerts a linear compressive load on the spring when urged in a first rotational direction.

3. The isolating torque coupler of claim 1, wherein the second edge of each of the lobes of the drive element and the first end of the corresponding one of the voids of the driven element exert a non-linear compressive load on the spring when urged in a second rotational direction opposite the first rotational direction.

4. The isolating torque coupler of claim 3, further comprising the second edge of each of the lobes of the drive element and the first end of the corresponding one of the void of the driven element exerting a non-linear compressive buckling load on the spring when urged in the second rotational direction.

5. The isolating torque coupler of claim 4, wherein the spring interferingly moves against the second side in response to the non-linear compressive buckling load on the spring.

6. The isolating torque coupler of claim 5, wherein the spring interferingly moves against the second side in response to the non-linear compressive buckling load on the spring comprises the second side inducing a friction load on the spring.

7. The isolating torque coupler of claim 6, wherein the friction load on the spring induces rotational damping and hysteresis.

8. The isolating torque coupler of claim 1, wherein the first and second annular cage elements each defining an outer periphery and a plurality of voids, each void having a substantially rectangular shape including first and second sides comprises each first side being proximal to a center point associated with a center line of the isolating torque coupler and perpendicular to a radial line from the center point and the second side being distal to the center point and curved concentric to the outer periphery.

9. The isolating torque coupler of claim 1, wherein the first and second annular cage elements each defining an outer periphery and a plurality of voids, each void having a substantially rectangular shape including first and second sides comprises each first side being proximal to a center point associated with a center line of the isolating torque coupler and perpendicular to a radial line from the center point and the second side being distal to the center point and parallel to the first side.

10. The isolating torque coupler of claim 1, wherein the first and second annular cage elements each defining an outer periphery and a plurality of voids, each void having a substantially rectangular shape including first and second sides comprises each first side being proximal to a center point associated with a center line of the isolating torque coupler and perpendicular to a radial line from the center point and the second side being distal to the center point and curved eccentric to the outer periphery.

11. A torque coupler rotatably coupling a rotatable drive member and a rotatably driven member to transfer torque in either a first direction or a second direction, comprising:

a drive element positioned between first and second coaxial annular cage elements of a driven element;

the first and second annular cage elements each having an outer periphery and including a plurality of voids, each void having a substantially rectangular shape including first and second sides and first and second ends, wherein each first side is proximal to a center point associated with the center line and perpendicular to a radial line from the center point and wherein the second side is a curved arc distal to the center point;

the drive element including a hub portion coupled to the rotatable drive member and a plurality of lobes formed near the outer periphery, the lobes defining a plurality of openings formed near the outer periphery, wherein each of the lobes includes a first edge and a second edge;

the plurality of openings of the drive element aligned with the voids of the first and second cage elements and accommodating a corresponding plurality of isolator springs assembled therein;

each isolator spring being a helical coil compression spring having a unitary diameter and squared first and second ends;

the first edge of each of the lobes of the drive element being contiguous to the first end of each of a corresponding one of the voids of the driven element;

the second edge of each of the lobes of the drive element being contiguous to the second end of each of a corresponding one of the voids of the driven element;

the first edge of each of the lobes of the drive element being parallel to the second end of the corresponding one of the voids of the driven element;

the second edge of each of the lobes of the drive element being non-parallel to the first end of the corresponding one of the voids of the driven element.

12. The torque coupler of claim 11, wherein the first edge of each of the lobes of the drive element and the second end of the corresponding one of the voids of the driven element exerts a linear compressive load on the spring when urged in a first rotational direction.

13. The torque coupler of claim 11, wherein the second edge of each of the lobes of the drive element and the first end of the corresponding one of the voids of the driven element exert a non-linear compressive load on the spring when urged in a second rotational direction opposite the first rotational direction.

14. The torque coupler of claim 13, further comprising the second edge of each of the lobes of the drive element and the first end of the corresponding one of the void of the driven element exerting a non-linear compressive buckling load on the spring when urged in the second rotational direction.

15. The torque coupler of claim 14, wherein the spring interferingly moves against the second side in response to the non-linear compressive buckling load on the spring.

16. The torque coupler of claim 15, wherein the spring interferingly moves against the second side in response to the non-linear compressive buckling load on the spring comprises the second side inducing a friction load on the spring.

17. The torque coupler of claim 16, wherein the friction load on the spring induces rotational damping and hysteresis.

18. The torque coupler of claim 11, wherein the second side of each of the substantially rectangular shape voids being a curved arc distal to the center point comprises the second side being distal to the center point and curved concentric to the outer periphery.

19. The torque coupler of claim 11, wherein the second side of each of the substantially rectangular shape voids being a curved arc distal to the center point comprises the second side being distal to the center point and parallel to the first side.

20. An isolating torque coupler rotatably coupling a rotatable drive member and a rotatably driven member, comprising:
- a disk-shaped drive element rotatably coupled to a disk-shaped driven element including a cage and a plurality of compression springs;
- the cage defining an outer periphery and a plurality of voids, each void including an outer second side and first and second ends;
- the drive element including a plurality of lobes formed near the outer periphery, the lobes defining a plurality of openings, wherein each of the lobes includes a first edge and a second edge;
- the plurality of openings of the drive element aligned with the voids of the cage to accommodate the compression springs inserted therein;
- each compression spring having squared first and second ends;
- the first edge of each of the lobes of the drive element being contiguous to the first end of each of a corresponding one of the voids of the driven element;
- the second edge of each of the lobes of the drive element being contiguous to the second end of each of a corresponding one of the voids of the driven element;
- the first edge of each of the lobes of the drive element being parallel to the second end of the corresponding one of the voids of the driven element;
- the second edge of each of the lobes of the drive element being non-parallel to the first end of the corresponding one of the voids of the driven element.

* * * * *